United States Patent
Wang et al.

(10) Patent No.: US 8,254,224 B2
(45) Date of Patent: Aug. 28, 2012

(54) SERVOING SYSTEM FOR MASTER WITH PARALLEL TRACKS IN A HOLOGRAPHIC REPLICATION SYSTEM

(75) Inventors: Xeufeng Wang, Schenectady, NY (US); Pierino Gianni Bonanni, Loudonville, NY (US); Xiaolei Shi, Niskayuna, NY (US); Zhiyuan Ren, Malta, NY (US); Hua Xia, Niskayuna, NY (US); Victor Petrovich Ostroverkhov, Ballston Lake, NY (US); Xinghua Wang, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/949,628

(22) Filed: Nov. 18, 2010

(65) Prior Publication Data

US 2012/0127843 A1    May 24, 2012

(51) Int. Cl.
*G11B 7/00* (2006.01)
(52) U.S. Cl. ............... 369/44.37; 369/44.32; 369/53.19; 369/103
(58) Field of Classification Search .................. 369/103, 369/44.32, 44.37, 44.26, 53.19, 44.41, 44.23, 369/94, 84
See application file for complete search history.

(56) References Cited

U.S. PATENT DOCUMENTS

| | | | |
|---|---|---|---|
| 5,195,152 A | 3/1993 | Gupta | |
| 5,483,511 A | 1/1996 | Jewell et al. | |
| 5,535,189 A | 7/1996 | Alon et al. | |
| 5,574,712 A | 11/1996 | Alon et al. | |
| 5,825,743 A | 10/1998 | Alon et al. | |
| 5,917,797 A | 6/1999 | Kosoburd | |
| 6,212,148 B1 | 4/2001 | Hesselink et al. | |
| 6,272,095 B1 | 8/2001 | Liu et al. | |
| 6,501,571 B1 | 12/2002 | Wang et al. | |
| 6,545,968 B1 | 4/2003 | Oakley | |
| 6,791,914 B1 | 9/2004 | Marchant | |
| 6,898,167 B2 | 5/2005 | Liu et al. | |
| 6,940,805 B2 | 9/2005 | Finkelstein et al. | |
| 7,388,695 B2 | 6/2008 | Lawrence et al. | |
| 7,453,611 B2 | 11/2008 | Raguin et al. | |

(Continued)

FOREIGN PATENT DOCUMENTS
EP    491458    6/1992
(Continued)

OTHER PUBLICATIONS

U.S. Appl. No. 12/949,621, filed Nov. 18, 2010, Xuefeng Wang et al.

(Continued)

*Primary Examiner* — Thang Tran
(74) *Attorney, Agent, or Firm* — Fletcher Yoder (57) ABSTRACT

Techniques are provided for controlling the reading of optical data from a master disk in a holographic replication system. Imperfections in the master disk or movement of the disk during a recording process may cause source beams to deviate from target data tracks. In some embodiments, a detector system is used to determine the focus and alignment of the source beams on the master disk, as well as the tilt and rotation of the disk with respect to the holographic replication system. The detector system may detect deviations in the intensity distribution of the reflections of the source beams and generate an error signal corresponding to focusing, tracking, tilt, and/or rotational errors. Servo-mechanical devices may actuate optical components to compensate for such errors.

32 Claims, 9 Drawing Sheets

U.S. PATENT DOCUMENTS

| | | | |
|---|---|---|---|
| 2002/0110077 | A1 | 8/2002 | Drobot et al. |
| 2005/0259304 | A1 | 11/2005 | Someno |
| 2006/0087929 | A1 | 4/2006 | Assis et al. |
| 2007/0086309 | A1 | 4/2007 | Yang |
| 2008/0089209 | A1 | 4/2008 | Miyamoto et al. |
| 2008/0239922 | A1* | 10/2008 | Fujita et al. .................. 369/103 |
| 2008/0252951 | A1 | 10/2008 | Knittel |
| 2008/0316902 | A1* | 12/2008 | Saito et al. ............... 369/112.23 |
| 2009/0003153 | A1 | 1/2009 | Yamatsu |
| 2009/0003177 | A1 | 1/2009 | Tanabe |
| 2009/0052312 | A1 | 2/2009 | Hayashi et al. |
| 2009/0080317 | A1 | 3/2009 | Martinez |
| 2009/0147333 | A1 | 6/2009 | Yamatsu et al. |
| 2009/0175138 | A1* | 7/2009 | Kim et al. ................. 369/44.11 |
| 2009/0175149 | A1* | 7/2009 | Bae et al. ..................... 369/103 |
| 2010/0053710 | A1* | 3/2010 | Bae et al. ........................ 359/31 |
| 2010/0165818 | A1* | 7/2010 | Ostroverkhov et al. ...... 369/103 |
| 2010/0195453 | A1* | 8/2010 | Miyamoto et al. ......... 369/44.11 |

FOREIGN PATENT DOCUMENTS

| | | |
|---|---|---|
| EP | 1494221 | 1/2005 |
| EP | 1522999 | 4/2005 |
| EP | 2104098 | 9/2009 |
| WO | WO2006064426 | 6/2006 |

OTHER PUBLICATIONS

U.S. Appl. No. 12/905,853, filed Oct. 15, 2010, Xinghua Wang et al.

U.S. Appl. No. 12/907,824, filed Oct. 19, 2010, Victor Petrovich Ostroverkhov et al.

* cited by examiner

FIG. 4
(MULTIPLE PICKUPS)

FIG. 5
(MULTIPLE CHANNELS
IN A SINGLE PICKUP)

SERVOING SYSTEM FOR MASTER WITH PARALLEL TRACKS IN A HOLOGRAPHIC REPLICATION SYSTEM

BACKGROUND

The present techniques relate generally to bit-wise holographic data storage techniques. More specifically, the techniques relate to methods and systems for parallel replication in holographic disks.

As computing power has advanced, computing technology has entered new application areas, such as consumer video, data archiving, document storage, imaging, and movie production, among others. These applications have provided a continuing push to develop data storage techniques that have increased storage capacity and increased data rates.

One example of the developments in data storage technologies may be the progressively higher storage capacities for optical storage systems. For example, the compact disc, developed in the early 1980s, has a capacity of around 650-700 MB of data, or around 74-80 minutes of a two channel audio program. In comparison, the digital versatile disc (DVD) format, developed in the early 1990s, has a capacity of around 4.7 GB (single layer) or 8.5 GB (dual layer). Furthermore, even higher capacity storage techniques have been developed to meet increasing demands, such as the demand for higher resolution video formats. For example, high-capacity recording formats such as the Blu-ray Disc™ format is capable of holding about 25 GB in a single-layer disk, or 50 GB in a dual-layer disk. As computing technologies continue to develop, storage media with even higher capacities may be desired. Holographic storage systems and micro-holographic storage systems are examples of other developing storage technologies that may achieve increased capacity requirements in the storage industry.

Holographic storage is the storage of data in the form of holograms, which are images of three dimensional interference patterns created by the intersection of two beams of light in a photosensitive storage medium. Both page-based holographic techniques and bit-wise holographic techniques have been pursued. In page-based holographic data storage, a signal beam containing digitally encoded data (e.g., a plurality of bits) is superposed on a reference beam within the volume of the storage medium resulting in a chemical reaction which modulates the refractive index of the medium within the volume. Each bit is therefore generally stored as a part of the interference pattern. In bit-wise holography or micro-holographic data storage, every bit is written as a micro-hologram, or Bragg reflection grating, typically generated by two counter-propagating focused recording beams. The data is then retrieved by using a read beam to reflect off the micro-hologram to reconstruct the recording beam.

Bit-wise holographic systems may enable the recording of closer spaced and layer-focused micro-holograms, thus providing much higher storage capacities than prior optical systems. However, the bandwidth of bit-wise holographic systems may be limited by the transfer rate of a single communication channel and the rotation speed of the holographic storage disk. For example, a typical disk rotation speed in a Blu-ray™ system at 12× BD rate may result in a single-channel transfer at approximately 430 Mbits/second. At this transfer rate, the recording time per data layer in the disk is approximately 500 seconds. Techniques for increasing transfer rates while reducing error rates in bit-wise micro-holographic systems may be advantageous.

BRIEF DESCRIPTION

An embodiment of the present techniques provides a method of reading signals from a master disk in a holographic replication system. The method includes emitting a plurality of source or read beams towards a plurality of target data tracks in a master disk in the holographic replication system to form a plurality of illumination spots on the master disk and receiving a plurality of signal beams from the master disk, where the plurality of signal beams includes reflections of the plurality of source beams from the master disk. The method then determines whether the plurality of illumination spots is focused and aligned in the plurality of target data tracks, based on the plurality of signal beams. The method adjusts the optical system when the plurality of illumination spots is determined to not be focused or to not align in the plurality of target data tracks.

Another embodiment provides a system for holographic replication. The system includes an optical system configured to emit a plurality of source beams towards a plurality of target data tracks in a master disk and a detector system configured to receive reflections of the plurality of source beams from the master disk and generate one or more error signals based on the received reflections. The system further includes a set of servo-mechanical devices configured to actuate components in the optical system based on the one or more error signals.

Yet another embodiment includes a replication system including an optical system, a detector system, and one or more servo-mechanical devices. The optical system is configured to emit a plurality of source beams towards a plurality of target data tracks in a master disk and receive a plurality of reflections from the master disk, where the plurality of reflections comprises reflections of the plurality of source beams from the master disk. The detector system is configured to receive the plurality of reflections and generate one or more of a focusing signal, a tracking signal, a tilt signal, and a rotation signal based on the received plurality of reflections. The one or more servo-mechanical devices are configured to actuate components in the optical system based on one or more of the focusing signal, the tracking signal, the tilt signal, and the rotation signal.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more embodiments of the present techniques will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for one of ordinary skill having the benefit of this disclosure.

Figure 1:
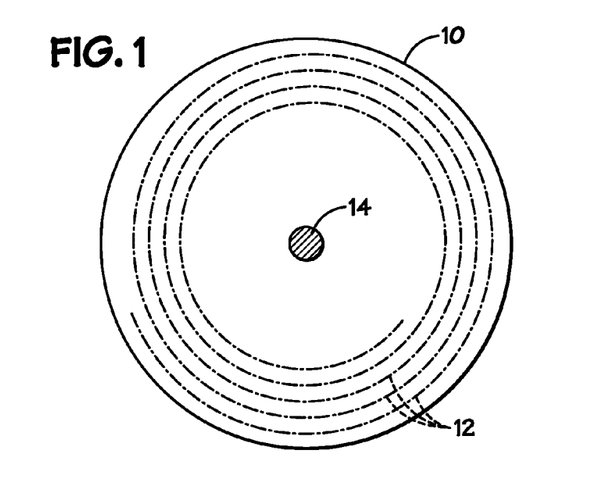
FIG. 1 illustrates an optical disk having data tracks, in accordance with embodiments.

Bit-wise holographic data storage systems typically involve recording by emitting two overlapping and interfering beams inside a recording medium (e.g., a holographic disk). Data bits are represented by the presence or absence of microscopically sized localized holographic patterns, referred to as micro-holograms, which act as volumetric light reflectors when illuminated by a focused beam. For example, the holographic disk 10 illustrated in FIG. 1 represents how data bits may be organized in a layer of the disk 10. Generally, the holographic disk 10 is a round, substantially planar disk with one or more data storage layers embedded in a transparent plastic film. The data layers may include any number of modified regions of the material substantially localized in depth that may reflect light, such as the micro-holograms used for a bit-wise holographic data storage. In some embodiments, the data layers may be embedded in the holographic recordable material which is responsive to the illumination intensity light beams impinged on the disk 10. For example, in different embodiments, the disk 10 materials may be threshold responsive or linearly responsive. The data layers may be between approximately 0.05 µm to 5 µm in thickness and may have a separation between approximately 0.5 µm to 250 µm.

Data in the form of micro-holograms may be generally stored in a sequential spiraling track 12 from the outer edge of the disk 10 to an inner limit, although concentric circular tracks, or other configurations, may be used. A spindle hole 14 may be sized to engage about a spindle in a holographic system, such that the disk 10 may be rotated for data recording and/or reading. The rotation of the spindle may be controlled by a closed loop system to maintain a constant linear velocity or a constant angular velocity during the recording and/or reading process. Moreover, the disk spindle, the recording optics, and/or the reading optics may be moved by a translation stage or sled in radial direction of the disk to allow the optical system to record or read across the entire radius of the disk.

Figure 2:
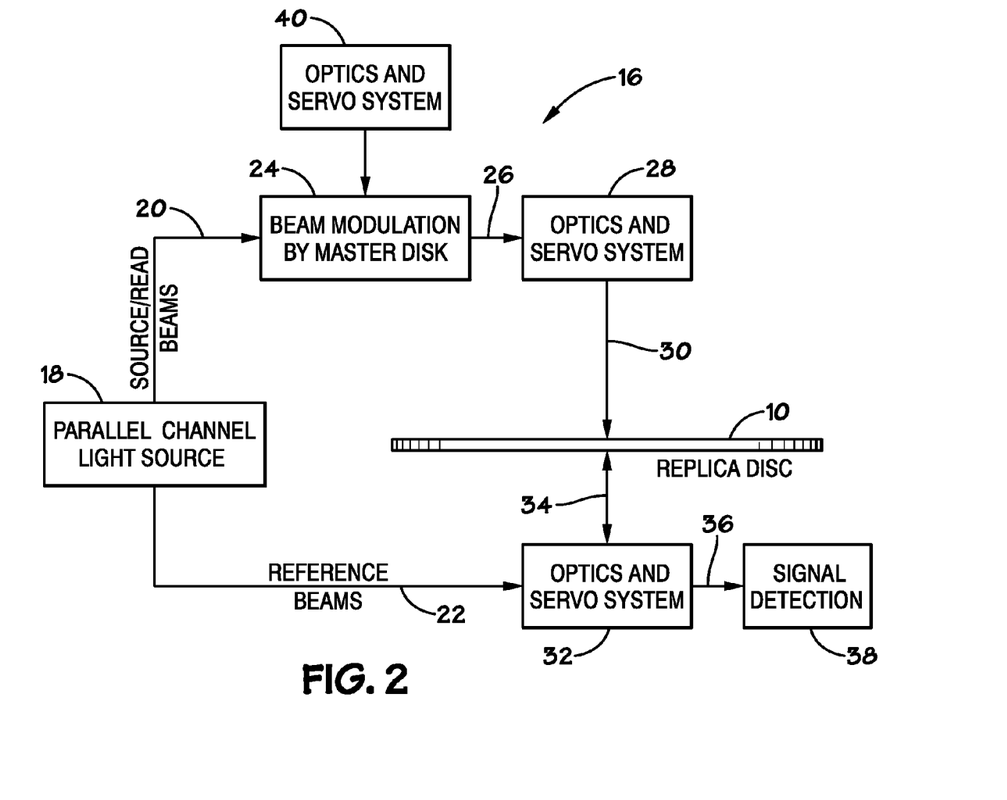
FIG. 2 is a block diagram of a micro-holographic replication system, in accordance with embodiments.

A general system of reading data from a master disk and recording micro-holograms to a replica disk 10 is provided in the block diagram of FIG. 2. The holographic system 16 includes a light source 18 which may be split into a source or read beam 20 and a reference beam 22. As will be discussed, in some embodiments, the light source 18 (which may be a single light source or multiple single-mode polarized light sources) may emit multiple nearly parallel light beams to be recorded over parallel tracks 12 in a disk 10. The multiple source beams may also be split into multiple read beams 20 and multiple reference beams 22. The read beams 20 may be transmitted to a master disk to be modulated (block 24) according to data recorded in the master disk. The read beams 20 may be transmitted through a master disk or reflected from a master disk (depending on the type of disk 10 and/or the configuration of the system 16), and portions of the read beams 20 transmitted through or reflected from the master disk may include data read from the master disk. In some embodiments, an optics and servo-mechanic system 40 may be coupled to the master disk reading system 24. The optics and servo-mechanic system 40 may include various optical and servo-mechanical components configured to focus the multiple source or read beams 20 on a master disk. As will be discussed, various imperfections of the system 16 and/or the master disk may result in errors in reading the master disk, which may result in errors in replicating in the replica disk 10. The optics and servo-mechanic system 40 may reduce such errors.

The transmitted or reflected portions of the source or read beams 20 may be referred to as signal beams 26, which may be directed to the replica disk 10 such that data from the master may be replicated on the replica disk 10. The signal beams 26 may be passed through another optics and servo-mechanic system 28, which may include various optical and servo-mechanic devices configured to focus the focused signal beams 30 on a particular location of the disk 10. For example, the optics and servo-mechanic system 28 may focus the focused signal beams 30 to a particular data layer or data tracks 12 in the disk 10.

The reference beams 22 may also be passed through an optics and servo-mechanic system 32 including various optics and servo-mechanic devices designed to focus the focused reference beams 34 to a particular data layer or data tracks 12 in the disk 10, such that the focused reference beams 34 overlap with the focused signal beams 30. Micro-holograms may be recorded in the holographic disk 10 in illuminated spots of an interference pattern formed by the two overlapping counter-propagating focused laser beams 30 and 34. In some embodiments, recorded micro-holograms may be retrieved from the disk 10 using the focused reference beams 34. Reflections of the focused reference beams 34, referred to as the data reflections 36, may be received at a detector for signal detection 38.

Such optical and servo-mechanical components 28, 32, and 40 may add to the complexity of an end-user device for recording a holographic disk 10. The present techniques provide methods and systems for pre-formatting and/or pre-populating a holographic disk 10 with micro-holograms such that the disk 10 may be modified and/or erased by an end-user device using a single beam exposure. Pre-populating a holographic disk may refer to the pre-recording of micro-holograms during a manufacturing process of the holographic disk 10. The micro-holograms recorded during the pre-populating process may represent code, address, tracking data, and/or other auxiliary information. The pre-recorded micro-holograms may be subsequently modified and/or erased using a single beam rather than overlapping counter-propagating beams. Thus, an end-user system need not maintain overlapping counter-propagating laser beams to record data to a pre-populated holographic disk. Instead, an end-user system using a single-sided beam or beams may be used to record data by modifying and/or erasing micro-holograms on the pre-populated holographic disk.

While recording micro-holograms with counter-propagating beams to pre-populate a holographic disk may decrease the complexity of micro-hologram modification for an end user device, the process of pre-populating the disk may also be improved in accordance with the present techniques. As discussed, when pre-populating the holographic disk 10, a master disk and a replica disk 10 may be rotated on a spindle in the holographic system. During the rotation, read beams are directed to be modulated by the data on the master disk, and the modulated signal beams are then directed to the replica disk 10 and overlapped with counter-propagating beams to record micro-holograms over selected tracks 12. The rotation speed of the master and replica disks are limited in part by the mechanical strength of the disk material. The limited rotation speed limits the transfer rate at which micro-holograms can be recorded. For example, a typical disk rotation speed of a Blu-ray Disc™ may result in a transfer rate in a single-channel system of approximately 430 Mbits/second at 12× BD rate. At this transfer rate, the recording time per data layer in the disk is approximately 500 seconds.

In one or more embodiments, multi-beam micro-hologram recording techniques may be used to increase the transfer rate and reduce the recording time for a holographic disk 10. For example, reading micro-holograms from multiple tracks 12 of a master disk may involve directing multiple beams to the master disk to illuminate more than one track 12. A beam may refer to a collection of light propagating in substantially the same direction through the same set of optical elements, and may include light originated from different light sources. The multiple data beams resulting from the illumination of the master disk may be directed to more than one track 12 of the replica disk 10 to overlap with multiple reference beams to create an interference pattern of illumination spots which result in multiple recorded micro-holograms in parallel tracks 12 of the replica disk 10. Furthermore, in some embodiments, the overlapping beams may interfere at a focused spot having a relatively small area with respect to the data layer plane. The focused illumination spots of the interference pattern may be separated by non-illuminated regions. By limiting the illuminated areas on a data layer, the depth spread of recorded micro-holograms may be limited to a desired size and/or limited on a desired data layer (e.g., between approximately 0.05 μm to 5 μm).

Figure 3A:
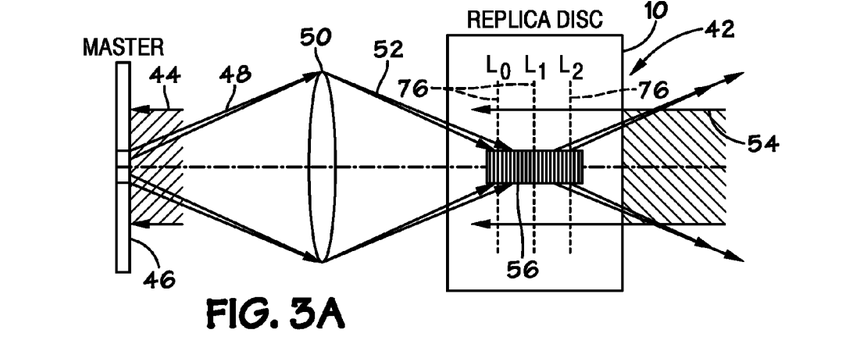
FIGS. 3A and 3B each illustrate a schematic diagram to compare a single beam replication technique and a multiple parallel beams replication technique, in accordance with embodiments.
Figure 3B:
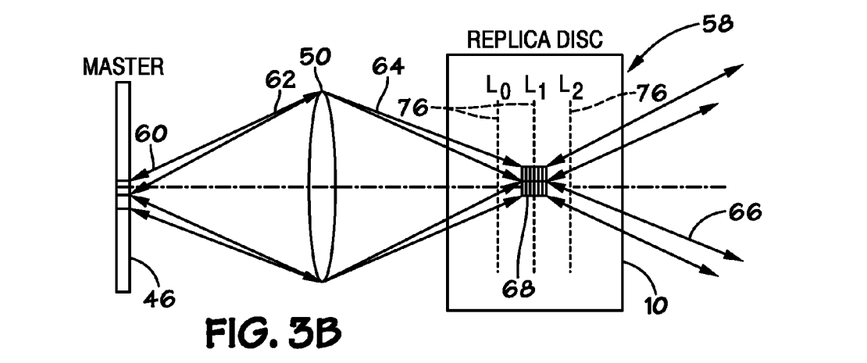

The schematic diagrams in FIGS. 3A and 3B compare two different approaches to recording micro-holograms in parallel. In FIG. 3A, the wide field illumination using a single beam approach 42 includes using a single beam 44 to illuminate a relatively wide field (e.g., spanning multiple data tracks 12) in a master disk 46. The master disk 46 may contain data to be replicated onto the replica disk 10, and spanning multiple data tracks 12 with the single beam 44 may allow data on multiple data tracks 12 to be replicated concurrently. The reflections 48 from the master disk 46 may be transmitted through an optical imaging system 50, represented as a lens in FIG. 3A, which may focus the reflections 48 and direct the focused reflections 52 to the replica disk 10. A single wide field reference beam 54 may also be directed to the opposite side of the replica disk 10, such that the focused reflections 52 and the reference beam 54 may counter-propagate and interfere to form a hologram pattern 56. The replica disk 10 may have multiple data layers 76, as represented by the vertical lines $L_0$, $L_1$, and $L_2$.

However, the increased field of view of the illumination of the single beams 44 and 54 generally results in an increased depth spread of the recorded hologram in the replica disk 10. The increased depth spread characteristic may refer to an increased size of a hologram which may span through a greater thickness of the disk 10 (in the direction of the single beams 44 and 54) and may span through more than one layer. For example, while the single beams 44 and 54 may both be directed to layer $L_1$, the linear material typically used for such page-based wide field illumination systems may be relatively sensitive to the wide illumination field, and the materials in adjacent layers $L_0$ and $L_2$ may also be affected by the single beams 44 and 54. Thus, increased depth spread in hologram recording may limit or decrease the data capacity of the holographic disk 10, as recording one holographic pattern may require more than one data layer.

One embodiment of the present techniques is presented in the multiple parallel beam approach 58. Rather than illuminating a relatively wide field with a single beam, as in the single beam approach 42, the multiple beam approach 58 involves impinging a holographic disk 10 with multiple counter-propagating beams. In one embodiment, multiple read beams 60 are directed to a master disk 46. Each beam may be focused on one track 12, and the reflections 62 (or transmissions, depending on different system designs) from the master disk 46 may be transmitted through an optical imaging system 50, represented as a lens in FIGS. 3A and 3B, which may image the reflections 62 to the replica disk 10.

Multiple reference beams 66 may also be directed to the opposite side of the disk 10. In some embodiments, the reference beams 66 and the read beams 60 may be split from a common parallel channel light source 18 (FIG. 2), and in some embodiments, the multiple reference beams 66 (and thus the multiple signal beams 60) may be transmitted from different single-mode polarized light sources. The parallel reference beams 66 and the transmission image 64 may counter-propagate and interfere to form an interference pattern on a data layer (e.g., data layer $L_1$) in the disk 10. The interference pattern may include multiple illumination spots (e.g., each spot may correspond to the interference of one pair of counter-propagating beams in parallel beam channels) separated by non-illuminated regions. Each of the interference spots may form a micro-hologram 68 in the data layer $L_1$. Because only a small fraction of the data layer plane in a data layer $L_1$ is illuminated with respect to the area of the whole data layer plane (rather than a wide region in the single beam approach 42), each of the beam spots (or micro-holograms 68) in the illumination pattern may be relatively focused within a single data layer $L_1$, potentially increasing the data capacity of the disk 10.

Figure 4:
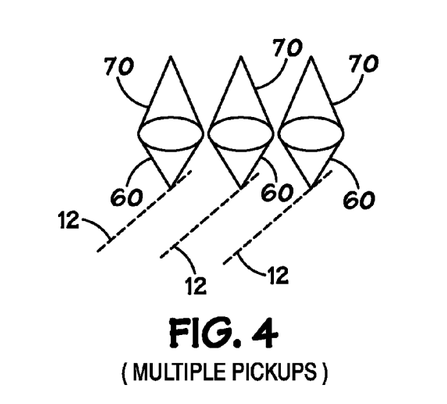
FIG. 4 is a schematic diagram of a multi-head system reading from multiple tracks of a holographic disk, in accordance with embodiments.

In some embodiments, using multiple beams for micro-hologram reading and/or recording over multiple tracks may utilize multiple optical heads, as illustrated in FIG. 4. The optical heads 70 may each emit a single beam, and multiple optical heads 70 in a replication system 16 (e.g., FIG. 2) may be arranged to each impinge a beam 60 over a data track 12 in the disk (e.g., a read beam into a master 46 or a data beam into a replica disk 10), such that multiple beams 60 are illuminating multiple tracks 12 in parallel. In some embodiments, each optical head may have separate optics configured to focus the beam 60 on a track 12.

Figure 5:
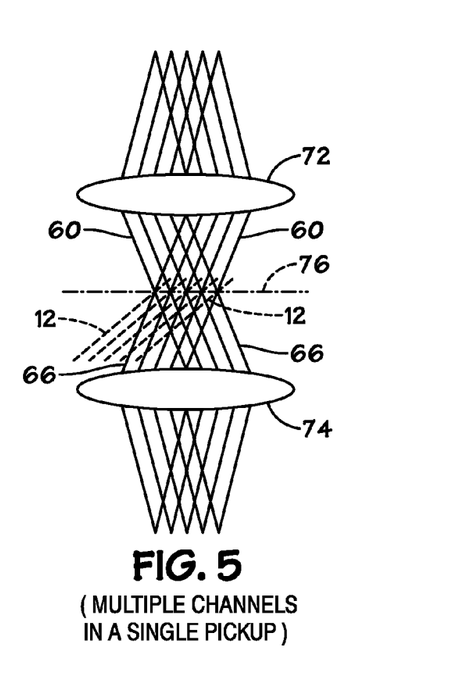
FIG. 5 is a schematic diagram of a single head transmitting multiple beams to read from multiple tracks of a holographic disk, in accordance with embodiments.

In another embodiment illustrated in FIG. 5, micro-hologram reading and/or recording over multiple tracks using multiple beams may utilize an optical head 72 which transmits multiple beams 60 of light in parallel, from one set of optics. In one embodiment, the multiple beams 60 from a single optical head 72 may be transmitted through a bundle of individual fibers suitable for transmitting a beam of light, such that each beam is discrete as it is transmitted out of the optical head 72 and onto multiple tracks 12 of a disk 10 or 46.

Figure 6:
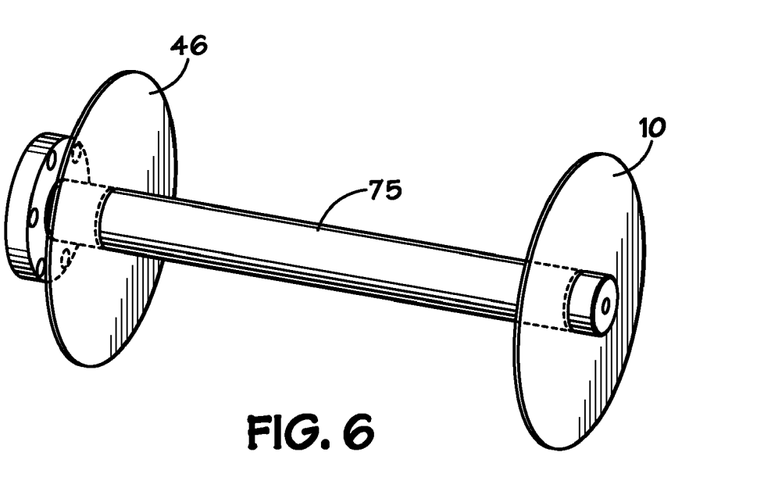
FIG. 6 is a diagram of a master disk and replica disk mounted on a spindle, in accordance with embodiments.

Techniques for replicating data from multiple tracks 12 of a master disk 46 to multiple tracks 12 of a replica disk 10 involve configuring the holographic recording system such that each of the multiple read beams is registered to particular tracks 12 on the master disk 46 and each of the multiple illumination spots (formed by the multiple signal and counter-propagating beams) is registered to particular tracks 12 on the replica disk 10 throughout the replication process. In embodiments, the reading of the master disk 46 and the replicating on the replica disk 10 may be performed synchronously (e.g., the two disks 46 and 10 may be mounted on the same spindle and rotated during the respective reading and replication processes). For example, FIG. 6 illustrates an embodiment having a master disk 46 and a replica disk 10 mounted on a spindle 75. As the data track pitch is approximately 1.6 µm in a CD disk, approximately 0.74 µm for a DVD, and approximately 0.3 µm for a Blu-ray Disc™ substantial precision may be used to control the accuracy of the multiple read beams and/or data beams across multiple data tracks 12. For example, if the multiple read beams become misaligned from the appropriate data tracks 12 of the master disk 46, inaccurate data may be read and replicated to the replica disk 10.

Figure 7:
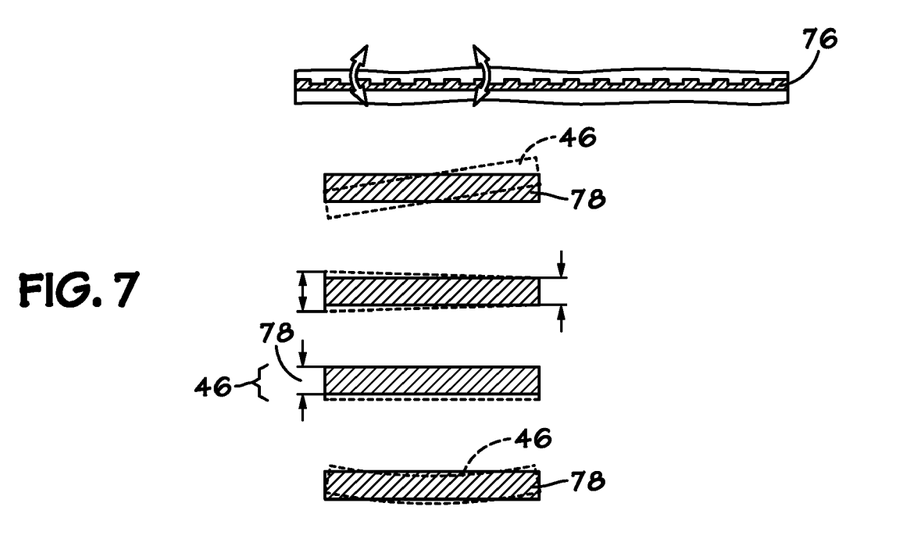
FIG. 7 is a schematic side view of several types of disk imperfections, in accordance with embodiments

The accuracy and precision of the replication process may be affected by imperfections in the master disk 46. As illustrated in FIG. 7, the holographic disk 46 may have a number of imperfections which decrease accuracy in a micro-hologram recording process. For example, the disk 46 may have an uneven surface, such that even when a tracking beam 86 is focused on a data layer 76 in the disk 46, the uneven surface of the disk 10 may cause beams to impinge the disk 46 inaccurately. Inaccuracies may also result if, for example, the disk 46 is tilted with respect to an expected position 78. For example, the disk 46 may have top and bottom surfaces that are not parallel or the disk 46 may be thicker than a perfect disk 46, such that when a disk 46 is fitted on a spindle in a replication system, the position of the disk 46 or a layer 76 of the disk 46 deviates from an expected position 78. Furthermore, the disk 46 may be warped, as represented by the curved shape of the disk 46 with respect to the expected position 78. Such inaccurate positioning or imperfections may result in micro-hologram reading errors from the master disk 46, which may result in micro-hologram replication errors in the replica disk 10.

Figure 8:
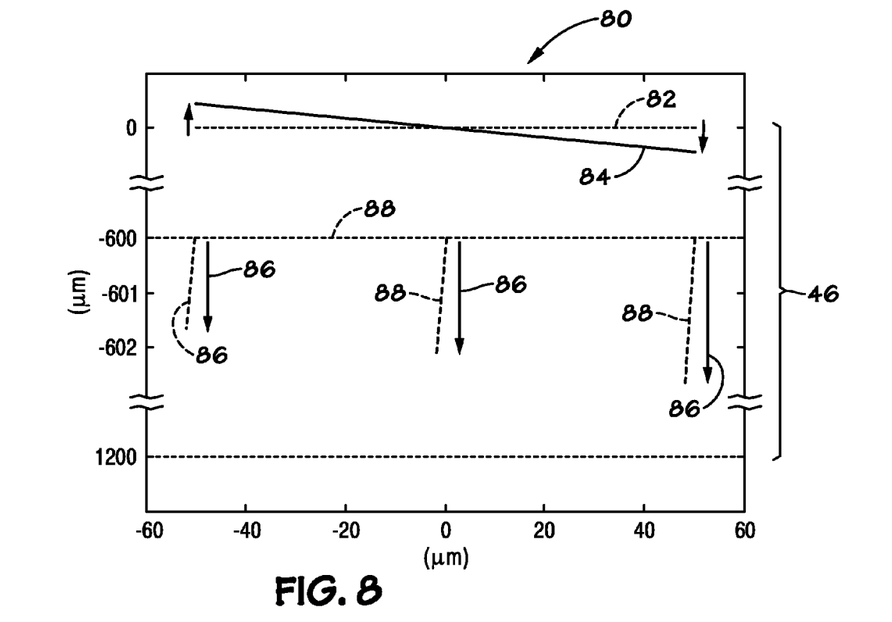
FIG. 8 is a graph representing an effect of disk tilting on illumination spots formed in a holographic disk, in accordance with embodiments.

For example, FIG. 8 provides a graph 80 comparing expected and actual positions of data tracks 12 in a disk 46. The x- and y-axes of the graph 80 provide radial distance and axial distance (both in micrometers) of the disk 46, respectively. The radial center of a disk 46 may be at x=0 µm while the top and bottom surfaces of the disk are expected to be from y=0 µm to y=−1200 µm. As represented at y=0 µm, the top surface 84 of the disk 46 is tilted with respect to the expected position 82 of the top surface of the disk 46. This tilt may be due to disk imperfections, or due to a tilt of the disk 46 with respect to the holographic recording system 16 (FIG. 2). If no adjustments are made to compensate for the tilt, read beams impinged on the master disk 46 may read the wrong data (e.g., if the beams impinge a different track 12 than the desired track 12) or not read data at all (e.g., if the beams do not register to any track 12). For example, the arrows 86 represent expected data positions to be read from the master disk 46. The data positions may be on desired tracks 12 and may range between approximately −600 µm and −602 µm from the top surface 84 of the disk 10. Due to the tilt of the disk 46, the actual illumination spots 88 may deviate from the expected illumination spots 86 both axially and radially, possibly resulting in focusing on the wrong track 12, or no track, depending on the severity of the disk tilt or imperfection. Such deviations may result in inaccurately reading micro-holograms from the master disk 46 and generating inaccurate data beams for replicating the replica disk 10.

In one or more embodiments, various techniques may be used to maintain the position of the read beams on the appropriate data tracks 12 of a master disk 46. During the reading of the master disk 46, the master disk 46 may be rotated about a spindle, and an optical head may read from an inner track 12 and/or an outer track 12 of the master disk 46. However, the linear velocity (e.g., the linear displacement at a single track 12) may be faster at an outer track 12 than at an inner track 12. Therefore, one or more embodiments include techniques for regulating the impingement on the master disk 46 such that data may be consistently read from different areas of the disk 46.

Figure 9:
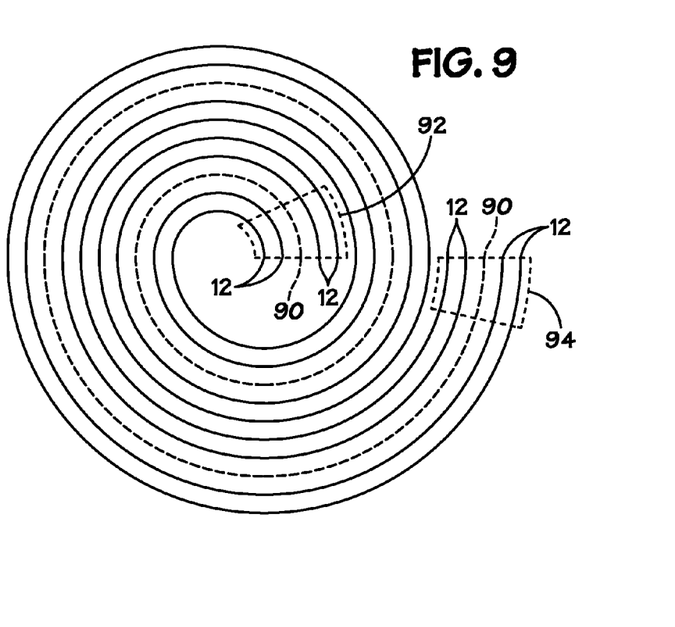
FIG. 9 illustrates a radial view of parallel data tracks in a holographic disk including timing information and a lead-in area and a lead-out area, in accordance with embodiments.
Figure 10A:
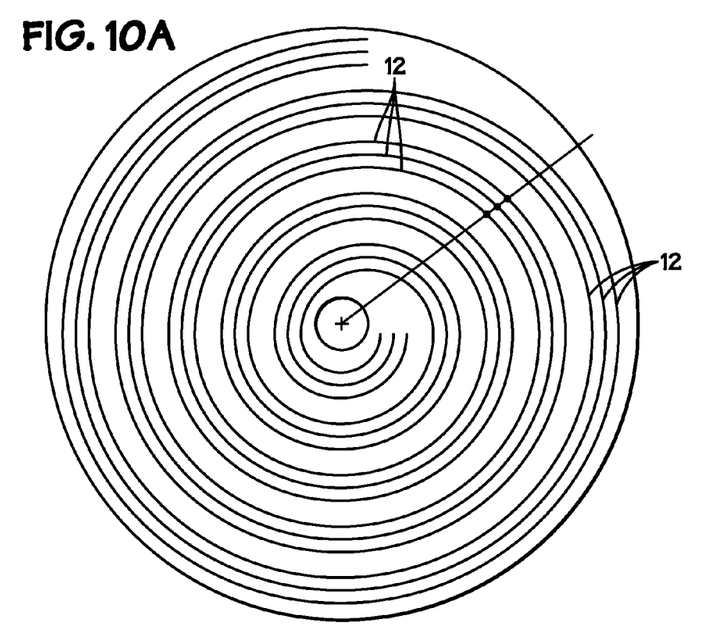
FIGS. 10A and 10B illustrate radial views of data tracks and illumination spot arrays in a holographic disk, in accordance with embodiments.
Figure 10B:
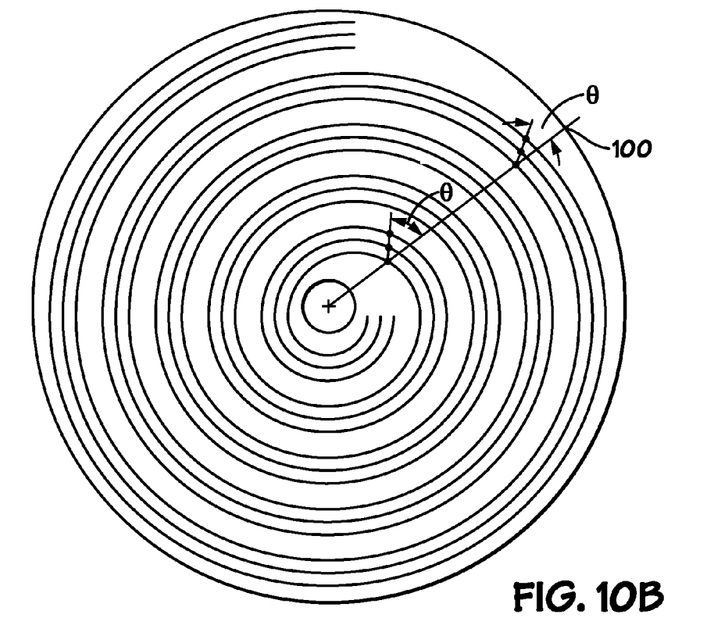

As illustrated in FIG. 9, in some embodiments, the master disk 46 may include main tracks 90 in parallel with other data tracks 12. The main tracks 90 may be encoded with data which provides timing information based on its position in the master disk 46. In another embodiment, the main track 90 may include encoded features or modulation marks, such as fixed frequency or modulated wobbles. Such encoded features and/or modulation marks may provide address and/or location information for the data tracks and may also serve as marks for determining disk rotation speed. An optical head may detect the reflections from the main tracks 90 to determine the position of the main track 90 with respect to the disk 46 and/or to adjust the rotation speed of the master disk spindle based on the encoded timing information. In some embodiments, the master disk 46 may include a wobbled groove 90 (e.g., along the data track spirals) which may also provide timing information for the reading process. For example, a detector may detect reflections from the wobbled groove 90 and determine the linear velocity of the reading based on the wobbled groove reflections.

Furthermore, in some embodiments the master disk 46 may include different functional areas, such as lead-in, user data, and lead-out areas, which may be used to align an optical head to the data tracks 12 of the disk 46. For example, a lead-in area 92 and a lead-out area 94 are illustrated in FIG. 9. The lead-in area 92 and lead-out area 94 may include features and information used to align the read beams 60 with multiple target data tracks 12 during an initialization process. Such features may include one or more tracks or grooves used for beam alignment. A replication system may initialize tracking and focusing at the lead-in area 92 of the master disk 46 by analyzing the reflection of the plurality of the read beams 60 from one or more target tracks 12 or grooves in the lead-in area 92 and adjusting one or more optical component to achieve focusing and tracking on the alignment tracks or grooves. Similarly, the system may close the replication process (e.g., after recording of the replica disk 10 is complete) at the lead-out area 94, which may provide a review of the replication process. In some embodiments, the lead-in area 92 and lead-out area 94 may be interchangeable (e.g., the replication process may begin and end on either area 92 or 94).

Moreover, to align multiple read beams 60 on targeted data tracks 12 on the master disk 46, the distance between adjacent read beams 60 may be fixed or adjusted according to the pitch distance of adjacent data tracks 12. If the fixed beams have a distance apart that is larger than the pitch of the data tracks 12, an array of the read beams 60 may be angled to maintain the registration of illumination spots on the multiple targeted data tracks 12. More specifically, the orientation of the illumination spot array (e.g., the line formed by the multiple illumination spots) may form an angle θ with respect to a radial direction of the disk. This angle θ may change as the focal location moves from the center to edge of the disk or vise versa. The change of the orientation of the multiple illumination spots may be achieved through adjustment of the optic and servo system to maintain registration of the multiple illumination spots on multiple target data tracks.

Figure 11:
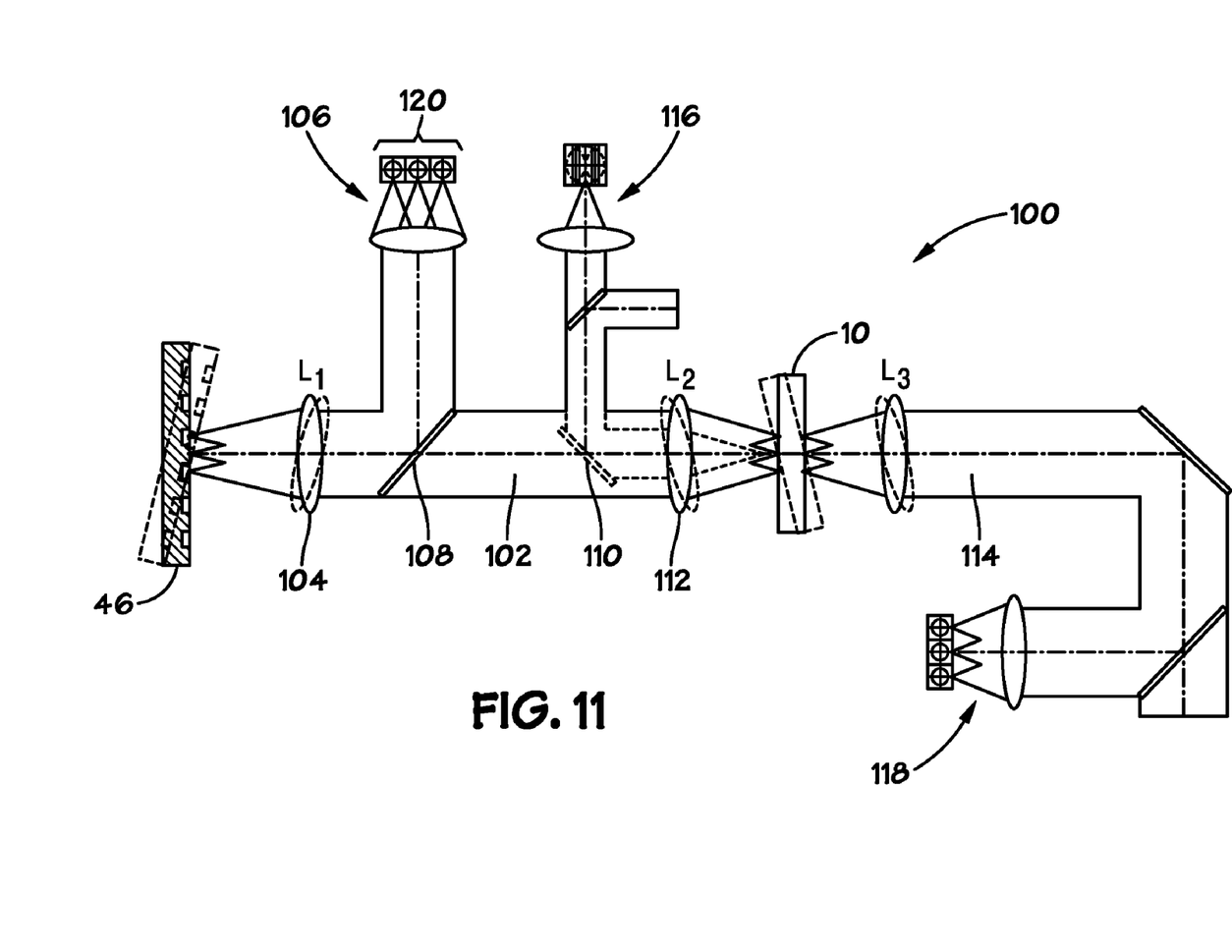
FIG. 11 is a schematic diagram of a holographic recording system, in accordance with embodiments.

FIG. 11 provides an illustration of the configuration of a holographic replication system 100. As represented in FIG. 11, data from a master disk 46 is retrieved and replicated on a replica disk 10. During the reading and replication process, the master disk 46 may be rotated and read by impinging multiple source or read beams which reflects from the master disk 46, resulting in multiple signal beams 102. The replica disk 10 may be rotated as it is replicated by impinging the multiple signal beams 102. In some embodiments, the master disk 46 and the replica disk 10 may be mounted on the same spindle for synchronous rotation (as illustrated in FIG. 6). As such, methods for actuating optical components to compensate for tilting and/or imperfections of the master disk 46 may be performed substantially dynamically, such that the appropriate data may be read from the master disk 46 and synchronously replicated on the replica disk 10.

The holographic replication system 100 may include a light source which emits multiple source beams to be impinged on multiple tracks 12 of a master disk 46. The master optical system 104 may focus the multiple source beams on desired tracks 12 the disk 46. The data tracks 12 of the master disk 46 includes data (e.g., in the form of reflective patterns or micro-holograms) which reflect portions of the multiple source beams. Not focusing on the desired tracks 12 may result in reading the wrong data, or not reading data, which translates to replication errors (e.g., replicating the wrong data, or not replicating data) on the replica disk 10.

In one or more embodiments, the master optical system 104 may include optical components, such as lenses or filters, and may also include servo-mechanical components configured to control the movement of the various optical components in the master optical system 104 such that the multiple source beams emitted through he master optical system 104 may be focused on the desired tracks 12 to read the appropriate data from the master 46 throughout a reading and replication process. The master optical system 104 may be actuated based on a feedback control loop which may generate error signals if the multiple source beams are out of focus or focused on an unintended data track 12.

Reflections of the multiple source or read beams from the disk 46, or the multiple signal beams 102, may be transmitted to the master beam detector 106. The master beam detector 106 may analyze the multiple signal beams 102 to determine a focusing and/or a tracking error. If a focusing and/or tracking errors are detected, the data beam detector 106 may transmit an error signal to servo-mechanical components in the master optical system 104. The servo-mechanical components may then adjust the optical components of the master optical system 104 to compensate for the error. For example, servo-mechanical components may tilt one or more lenses axially, radially, and/or tangentially, or move various components closer to or farther from the master disk 46, such that the illumination spots corresponding to the multiple signal beams 102 may be aligned to and/or focused on the appropriate data tracks 12 on the master disk 46.

The multiple signal beams 102 which include data corresponding to the illuminated portions of the master disk 46 may be transmitted through the data optical system 104 and various other elements (e.g., the beam splitter 108 and the dichroic filter 110) toward the data tracks 12 of the holographic replica disk 10. The multiple signal beams 102 may be transmitted through a replica optical system 112 and impinged on a replica disk 10. Counter-propagating reference beams 114 may be focused to interfere with the multiple data beams 102 on the replica disk 10, forming multiple illumination spots indicative of micro-holograms on the replica disk 10. In some embodiments, a reference detector system 116 may be used to control servo-mechanical components of a reference optical system 112. Further, a replica detector system 118 may be used to control the position of illumination spots formed on the replica disk 10 by the counter-propagating beams 102 and 114.

Figure 12:
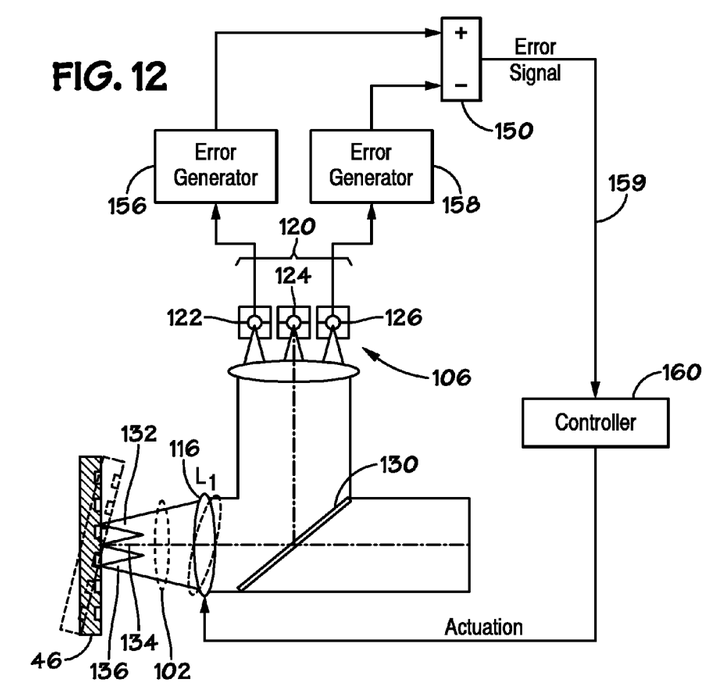
FIG. 12 is a schematic diagram of a detection system in a holographic recording system, in accordance with embodiments.

FIG. 12 illustrates an actuation system configured to generate and transmit a focus error signal and/or a tracking error signal to a tilting controller and/or a rotation controller, respectively. Generation of the error signal may begin with a set of detectors 120 in the detector system 106. The set of detectors 120 may include multiple quadrant detectors 122, 124, and 126, each configured to detect a reflection of one or more of the multiple source beams 102, and each of the detected reflections may be used to determine a tilt, movement, and/or imperfection of the master disk 46.

In some embodiments, each quadrant detector 122, 124, and 126 may detect an intensity distribution of the reflection from one of the multiple impinged beams. For example, an array of quadrant detectors (e.g., detectors 120) may detect the reflection from an array of beams impinged on and reflected from the master disk 46 (e.g., the multiple signal beams 102). In one embodiment, each of the detectors 122, 124, and 126 may be suitable for generating a focusing error signal (FES) and/or a tracking error signal (TES). The FES may be determined using an astigmatic method on the four quadrants of the detector (e.g., the main detector 124). The TES may be determined using a differential phase method on the four quadrants of the detector 124. In one embodiment, the FES and the TES of the main detector 124 may be used to determine when the multiple source beams are not focused and/or are off track.

The auxiliary detectors 122 and 126 may be suitable for generating tilting and rotation error signals based on the differential FES and TES, respectively. For example, the intensity distribution of the reflected beams 132 and 136 may be detected and transmitted to the error generators 156 and 158. In one embodiment, the intensity distributions of each of the different beams of an illumination array may be detected to determine a tilt of the impinged array area. For example, a first beam reflection 132 may be detected at the quadrant detector 122 and transmitted to the error generator 156, which generates a first FES and transmits this FES to a comparator 150. A second beam reflection 136 may be detected at the quadrant detector 126 and transmitted to the error generator 158, which generates a second FES and transmits this FES to the comparator 150. The comparator 150 may determine the differential of the first and second FES to determine a tilt of the master disk 46. For example, if the first FES is positive while the second FES is negative, the comparator may determine that the first beam 132 has a high relative intensity and the second beam 136 has a low relative intensity, which may indicate that the master disk 46 is tilted such that the disk position where the first beam 132 is impinged is tilted forward relative to the disk position where the second beam 136 is impinged. The comparator 150 may generate a tilt error signal 159 based on this comparison and transmit the tilt error signal 159 to a controller 160. The tilt error signal 159 may include information including an estimated tilt of the master disk 46, which may be represented by the tilted dotted outline of the master disk 46. In response, the controller 160 may control the servo-mechanical components coupled to the master optical system 104 and move various optical components (e.g., lenses, filters, etc.) to tilt relative to the master disk 46, as represented by the tilted dotted outline of the lens in the tracking optical system 104.

The intensity distribution of the reflected beams 132 and 136 may also be detected to determine a rotation of the master disk 46. For example, a first beam reflection 132 may be detected at the quadrant detector 122 and transmitted to the error generator 156, which generates a first tracking error signal (TES) and transmits this TES to a comparator 150. A second beam reflection 136 may be detected at the quadrant detector 126 and transmitted to the error generator 158, which generates a second TES and transmits this TES to the comparator 150. The comparator 150 may determine the differential of the first and second TES to determine a rotation of the master disk 46. The comparator 150 may generate a rotation error signal 158 based on this comparison and transmit the rotation error signal 158 to a controller 160. In response, the controller 160 may control the servo-mechanical components coupled to the master optical system 104 and rotate various optical components (e.g., lenses, filters, etc.) relative to the master disk 46.

Figure 13:
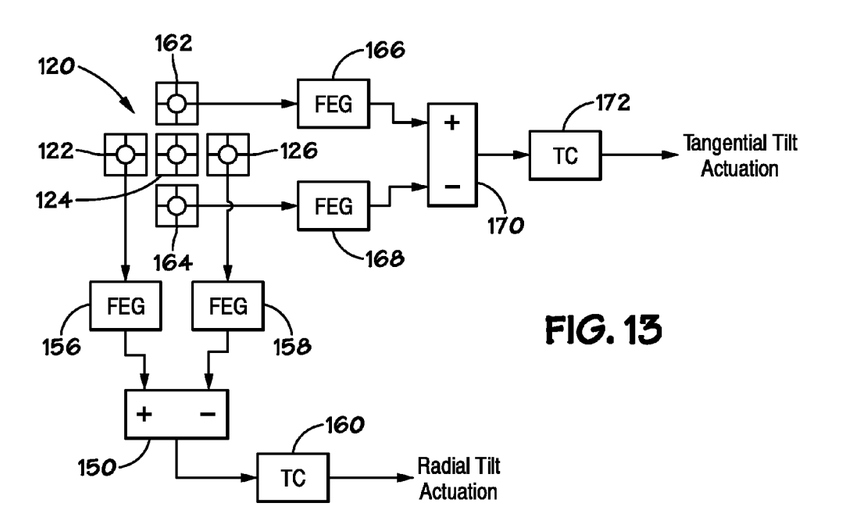
FIG. 13 is a schematic diagram representing tilt actuation in which may be used in a holographic recording system, in accordance with embodiments.

In some embodiments, a two-dimensional tilting actuation system may be employed. For example, as illustrated in FIG. 13, a detection system 120 may include multiple quadrant detectors 122, 124, 126, 162, and 164 arranged to detect reflected beams emitted in a two-dimensional array. The two-dimensional reflected beams may be detected to determine tilting of the master disk 46 in two dimensions. For example, in addition to the radial tilting actuation discussed in FIG. 12, one or more embodiments may also detect reflected beams at quadrant detectors 162 and 164. The quadrant detectors 162 and 164 may measure beams reflected from a different direction from the surface of the master disk 46 compared to the quadrant detectors 152 and 154 (e.g., latitudinal or longitudinal). As such, the quadrant detectors 162 and 164 may detect information suitable for employing tangential tilt actuation. The quadrant detectors 162 and 164 may transmit reflected beam intensity information to the FEGS 166 and 168, respectively, which each generate and transmit focus error signals to the comparator 170. Based on the comparison of the received focus error signals, the comparator 170 may generate and transmit a tilt error signal to the tangential tilt controller 172. While the radial tilt controller 160 discussed in FIG. 12 may control servo-mechanical components configured to control the tilt of optical components in a radial direction, the tangential tilt controller 172 may control servo-mechanical components configured to control the tilt of optical components in a tangential direction. Thus, if a master disk 46 is tilted radially or tangentially at an impinged area with respect to the holographic reading and replication system 16, optical components in the system 16 can be tilted to compensate for the tilt of the master disk 46.

Figure 14:
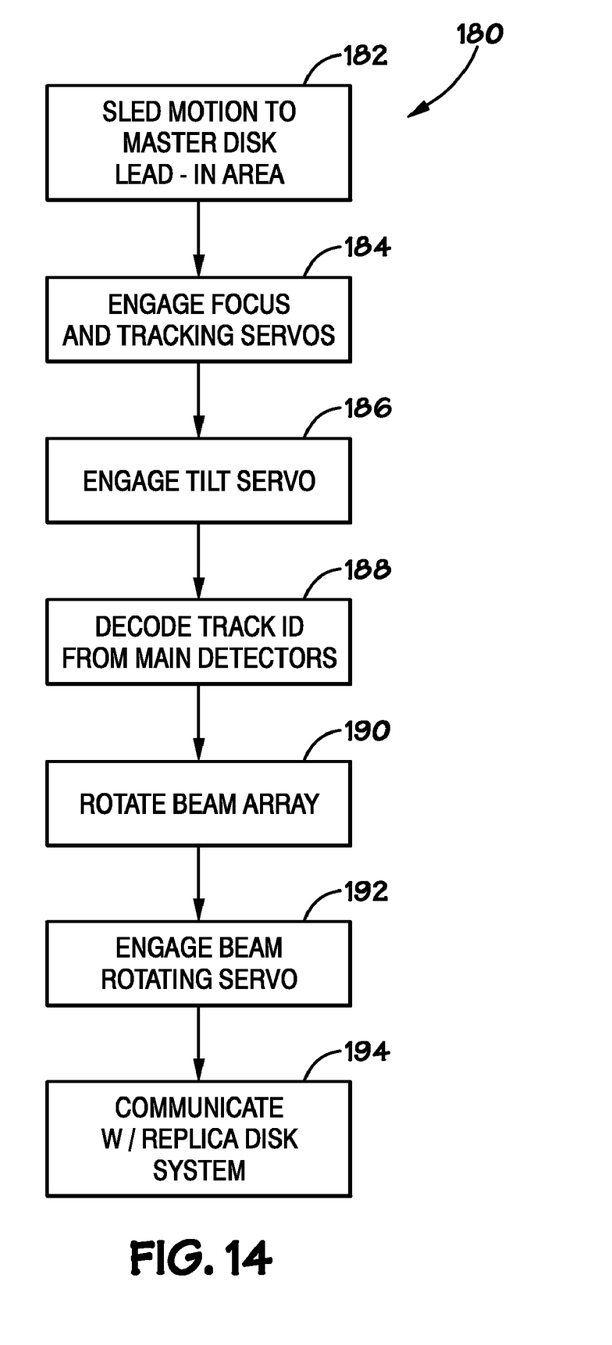
FIG. 14 is a flow chart of an initialization process for a master disk in a holographic recording system, in accordance with embodiments.

An initialization sequence for reading the master disk 46 in one embodiment is provided in the flow chart of FIG. 14. The process 180 begins by sledding (block 182) the spindle such that the lead-in area 92 of the master disk 46 is in a suitable position with respect to the master optical system 104 and/or with respect to the replication system 100. The process 180 may then engage (block 184) the focus and tracking servo devices based on the light intensity distribution detected at the main quadrant detector 124. In some embodiments, the main detector 124 may be the middle detector in a set of detectors 120, and may generate a focus error signal (FES) and a tilt error signal, as discussed with respect to FIG. 12. The process 180 may then engage (block 186) the tilt servo device based on the differential of the FES generated by the auxiliary detectors 122 and 126. In some embodiments, the process 180 may also involve engaging a continuous linear velocity servo (CLV servo) if the replication system 100 is operating in a CLV mode, as will be further discussed with respect to FIG. 15.

In some embodiments, the main detector 124 may detect reflections of light from the main track 90, which may include data (e.g., track ID) identifying the track 90. The process 180 may decode (block 188) the track ID from the main detector 124 and jump to a different track if the optical head is not on the correct track. The process 180 may involve continuously decoding and moving to a different track until the master optical system 104 is reading from the correct main track 90. The process 180 may then rotate (block 190) the array of the multiple source beams, such that the corresponding illumination spots formed on the master disk 46 may register to the correct surrounding parallel data tracks 12. The process may obtain the expected track IDs from the auxiliary detectors 122 and 126. The beam rotating servo may then be engaged (block 192) based on the differential of the tracing error signal (TES) generated by the auxiliary detectors 122 and 126. In some embodiments, the process 180 may also engage the laser power adjuster if the replication system 100 is in a constant angular velocity mode (CAV mode), as will be further discussed with respect to FIG. 16. The process 180 may then involve communicating (block 194) with system components involved in recording on the replica disk 10 (e.g., optical systems 122 and/or 114 from FIG. 11).

Figure 15:
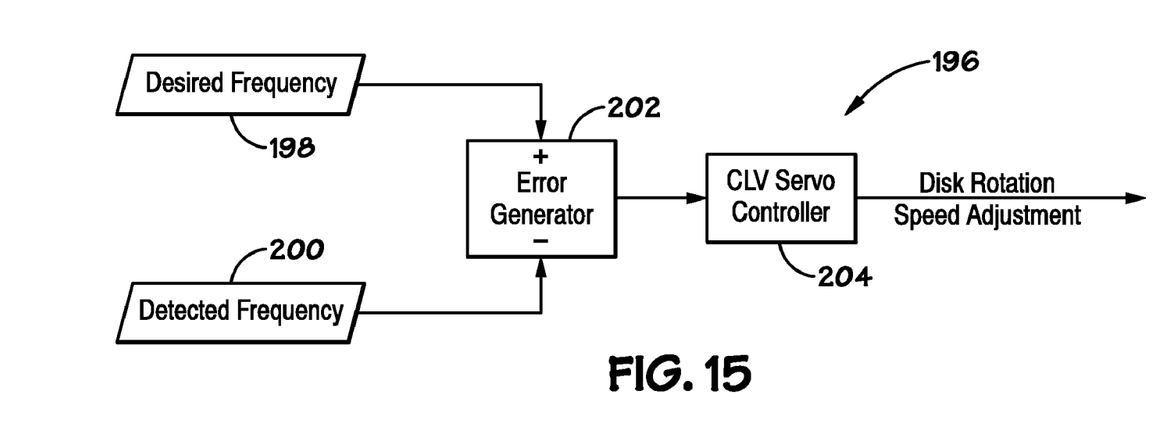
FIG. 15 is a diagram representing a continuous linear velocity technique in a holographic recording system, in accordance with embodiments.

One embodiment for engaging the CLV servo device is provided in the flow chart of FIG. 15. The process 196 involves transmitting a desired frequency 198 and a detected frequency 200 to an error generator 202. The desired frequency 198 may be a desired linear velocity of data detection over each data bit position along a data track 12, and may be provided by one or more controllers of the replication system 100. The detected frequency 200 may be the detected linear velocity of data detection over each data bit position. Based on the difference between the desired frequency 198 and the detected frequency 200, the error generator 202 may generate a linear velocity error signal, which may indicate that the master disk 46 is rotating too fast or too slowly. The linear velocity error signal may be transmitted to a CLV servo controller 204, which controls the adjustment of speed rotation until the detected frequency 200 is substantially equal to the desired frequency 198. Therefore this process 196 may be applicable in a CLV mode of operation, as the angular disk rotation may be changed to maintain a constant linear velocity.

Figure 16:
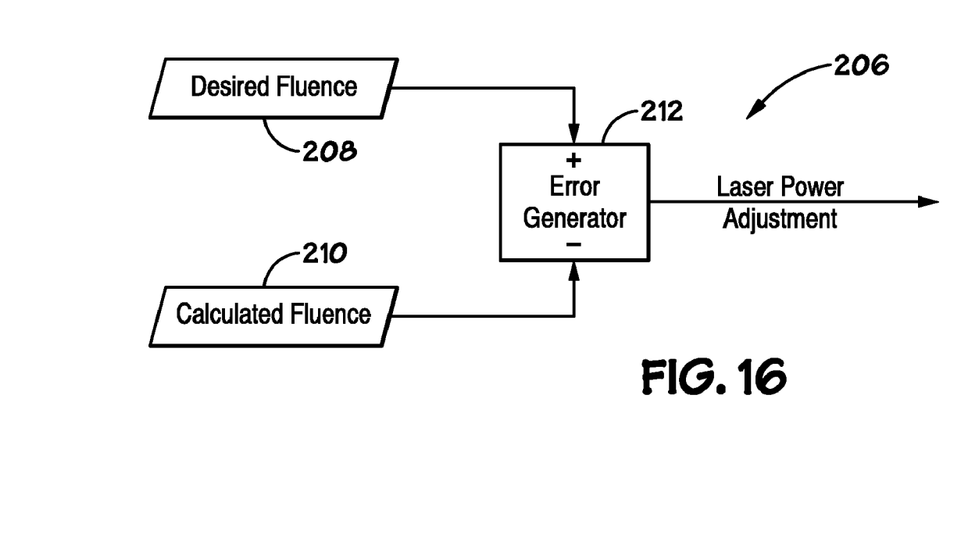
FIG. 16 is a diagram representing a continuous angular velocity technique in a holographic recording system, in accordance with embodiments.

Another embodiment for adjusting the power of the laser is provided in the flow chart of FIG. 16. The process 206 involves transmitting a desired fluence 208 and a calculated fluence 210 to an error generator 212. The desired fluence may be a function of light intensity and exposure time of the multiple source beams impinged on the master disk 46. The fluence may also be described as an exposure of light energy per unit area of the disk 46 at a certain time. As data is read from the master disk 46 to be recorded on the replica disk 10 at a certain desired fluence, the replication process may be affected by light intensity as well as exposure time. As discussed, exposure time of light beams impinging the disk 46 may change depending on where light is being impinged, assuming the disk is operating in a constant angular velocity mode (e.g., the disk angular rotational speed is not changed, in contrast to the CLV mode described in FIG. 15). The error generator 212 may determine the difference between the desired fluence 208 and the calculated fluence 210 and generate a fluence error signal, which may indicate whether the impinged beams should be adjusted to increase or decrease light intensity. Therefore, by adjusting light beam intensity, the process 206 may compensate for different linear velocities of reading and/or replicating while maintaining a constant angular velocity.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of reading signals from a master disk in a holographic replication system, the method comprising: providing one or more replica disks to replicate data from the master disk
    emitting a plurality of source beams toward a plurality of target data tracks in a master disk in the holographic replication system to form a plurality of illumination spots on the master disk;
    receiving a plurality of signal beams directed toward the one or more replica disks from the master disk, wherein the plurality of signal beams comprises reflections of the plurality of source beams and data to be replicated to the one or more replica disks from the master disk;
    determining whether the plurality of illumination spots is focused and aligned in the plurality of target data tracks, based on the plurality of signal beams; and
    adjusting the optical system when the plurality of illumination spots is determined to not be focused or to not align in the plurality of target data tracks.

2. The method of claim 1, wherein determining whether the plurality of source beams is focused on the plurality of target data tracks comprises analyzing an intensity distribution of the reflections of the plurality of source beams.

3. The method of claim 2, wherein analyzing the intensity distribution of the reflections of the plurality of source beams comprises using an astigmatic focus method.

4. The method of claim 1, wherein adjusting the optical system comprises engaging a focusing servo-mechanical device of the optical replication system.

5. The method of claim 1, wherein determining whether the plurality of source beams is aligned in the plurality of target data tracks comprises analyzing an intensity distribution of the reflections of the plurality of source beams.

6. The method of claim 5, wherein analyzing the intensity distribution of the reflections of the plurality of source beams comprises using a differential phase method.

7. The method of claim 5, wherein adjusting the optical system comprises engaging a tracking servo-mechanical device of the optical replication system.

8. The method of claim 1, wherein determining whether the plurality of source beams is focused on the plurality of target data tracks comprises:
    analyzing a first intensity distribution of the reflections detected at a first auxiliary detector;
    analyzing a second intensity distribution of the reflections detected at a second auxiliary detector; and
    determining a tilting error based on a difference between the first intensity distribution and the second intensity distribution.

9. The method of claim 8, wherein adjusting the optical system comprises engaging a tilting servo-mechanical device of the optical replication system, wherein the tilting servo-mechanical device is configured to actuate an optical element of the optical system in a tilting motion.

10. The method of claim 9, wherein the tilting motion comprises one or more of a tangential tilt motion and a radial tilt motion.

11. The method of claim 1, wherein determining whether the plurality of source beams is aligned in the plurality of target data tracks comprises:
    analyzing a first intensity distribution of the reflections detected at a first auxiliary detector;
    analyzing a second intensity distribution of the reflections detected at a second auxiliary detector; and
    determining a rotational error based on a difference between the first intensity distribution and the second intensity distribution.

12. The method of claim 11, wherein adjusting the optical system comprises engaging a rotational servo-mechanical device of the optical replication system, wherein the rotational servo-mechanical device is configured to actuate an optical element of the optical system in a rotational motion.

13. The method of claim 1, comprising engaging a continuous linear velocity (CLV) servo-mechanical device based on a difference between a desired linear velocity the plurality of signal beams to be received and a detected linear velocity at which the plurality of signal beams is received.

14. The method of claim 13, wherein the rotational velocity of the master disk is adjusted as a result of engaging the continuous linear velocity (CLV) servo-mechanical device.

15. A system for holographic replication, the system comprising: one or more replica disks to replicate data from a master disk
    an optical system configured to emit a plurality of source beams toward a plurality of target data tracks in the master disk;
    a detector system configured to receive a plurality of signal beams directed toward the one or more replica disks from the master disk, wherein the plurality of signal beams comprises reflections of the plurality of source beams and data to be replicated to the one or more replica disks from the master disk and generate one or more error signals based on the received signal beams; and
    a set of servo-mechanical devices configured to actuate components in the optical system based on the one or more error signals.

16. The system of claim 15, wherein the detector system comprises a main quadrant detector configured to decode timing information based on the received reflections.

17. The system of claim 16, wherein the timing information comprises reflections from a main data track of the plurality of target data tracks, wherein the main data track comprises embedded timing information.

18. The system of claim 16, wherein the timing information comprises reflections from a wobbled track or a groove of the master disk.

19. The system of claim 16, comprising a continuous linear velocity (CLV) servo controller configured to adjust a rotation of the master disk with respect to the system based on the decoded timing information and based on a desired linear velocity of the reflections of the plurality of source beams from the master disk.

20. The system of claim 16, comprising a laser power adjuster configured to adjust a power of a laser emitting the plurality of source beams based on the decoded timing information and based on a desired fluence of the reflections of the plurality of source beams from the master disk.

21. The system of claim 15, wherein the detector system comprises a main quadrant detector configured to determine a focus of one of the plurality of source beams on a main data track in the master disk, based on an intensity distribution of the received reflections.

22. The system of claim 15, wherein the detector system comprises a main quadrant detector configured to determine an alignment of one of the plurality of source beams on a main data track in the master disk, based on an intensity distribution of the received reflections.

23. The system of claim 15, wherein the detector system comprises at least two auxiliary quadrant detectors, wherein the one or more error signals comprises a tilt error signal based on a difference between a pair of focus error signals generated from received reflections at each of the two auxiliary quadrant detectors, and wherein the set of servo-mechanical devices is configured to actuate components in a tilting motion based on the tilt error signal.

24. The system of claim 15, wherein the detector system comprises at least two auxiliary quadrant detectors, wherein the one or more error signals comprises a rotation error signal based on a difference between a pair of tracking error signals generated from received reflections at each of the two auxiliary quadrant detectors, and wherein the set of servo-mechanical devices is configured to actuate components in a rotating motion based on the rotation error signal.

25. A replication system comprising: one or more replica disks to replicate data from a master disk
an optical system configured to:
emit a plurality of source beams toward a plurality of target data tracks in the master disk; and
receive a plurality of reflections directed toward the one or more replica disks from the master disk, wherein the plurality of reflections comprises reflections of the plurality of source beams and data to be replicated to the one or more replica disks from the master disk;
a detector system configured to receive the plurality of reflections and generate one or more of a focusing signal, a tracking signal, a tilt signal, and a rotation signal based on the received plurality of reflections; and
one or more servo-mechanical devices configured to actuate components in the optical system based on one or more of the focusing signal, the tracking signal, the tilt signal, and the rotation signal.

26. The system of claim 25, wherein the detector system comprises a main detector configured to detect an intensity distribution of a main reflection of the plurality of reflections, wherein the main reflection comprises a reflection of a main source beam of the plurality of source beams, wherein the main source beam is emitted toward a main target data track in the master disk.

27. The system of claim 26, wherein the main detector is configured to generate the focusing signal based on the main reflection using an astigmatic method.

28. The system of claim 26, wherein the main detector is configured to generate the tracking signal based on the main reflection using a differential phase method.

29. The system of claim 26, wherein the detector comprises at least two auxiliary detectors each adjacent to the main detector, wherein the detector system is configured to generate a tilt signal based on a differential of focus error signals generated from intensity distributions of the plurality of reflections received at each of the two auxiliary detectors.

30. The system of claim 26, wherein the detector comprises at least two auxiliary detectors each adjacent to the main detector, wherein the detector system is configured to generate a rotation signal based on a differential of tracking error signals generated from intensity distributions of the plurality of reflections received at each of the two auxiliary detectors.

31. The method of claim 1, comprising engaging a laser adjuster based on a difference between a desired fluence of an impingement of the plurality of source beams on the master disk and a detected fluence of an impingement of the plurality of source beams on the master disk.

32. The method of claim 14, comprising adjusting a laser configured to emit the plurality of source beams by using the laser adjuster when the desired fluence is not equal to the detected fluence.

* * * * *